United States Patent
Drossel et al.

(10) Patent No.: US 11,268,492 B2
(45) Date of Patent: Mar. 8, 2022

(54) METHOD FOR OPERATING A WIND TURBINE TO CONTROL ROTATIONAL SPEED OF A WIND TURBINE IN THE EVENT OF A GRID ERROR

(71) Applicant: Nordex Energy GMBH, Hamburg (DE)

(72) Inventors: Detlef Drossel, Norderstedt (DE); Ulrich Harms, Hamburg (DE)

(73) Assignee: Nordex Energy GmbH, Hamburg (DE)

( * ) Notice: Subject to any disclaimer, the term of this patent is extended or adjusted under 35 U.S.C. 154(b) by 0 days.

(21) Appl. No.: 16/838,306

(22) Filed: Apr. 2, 2020

(65) Prior Publication Data
US 2020/0318610 A1  Oct. 8, 2020

(30) Foreign Application Priority Data
Apr. 3, 2019  (EP) .................. 19 167 076

(51) Int. Cl.
  *F03D 7/04*  (2006.01)
  *F03D 7/02*  (2006.01)
  *F03D 9/25*  (2016.01)
(52) U.S. Cl.
  CPC ......... *F03D 7/0224* (2013.01); *F03D 7/0276* (2013.01); *F03D 7/0284* (2013.01);
  (Continued)
(58) Field of Classification Search
  CPC ...... F03D 7/0224; F03D 7/0284; F03D 7/043; F03D 7/0276; F03D 9/255; F05B 2270/337; F05B 2270/327; F05B 2270/101
  See application file for complete search history.

(56) References Cited

U.S. PATENT DOCUMENTS 8,618,685 B2 * 12/2013 Drossel ................ F03D 7/0284
  290/44
8,896,142 B2 * 11/2014 Arlaban Gabeiras ........................
  H02J 3/1885
  290/44

(Continued)

FOREIGN PATENT DOCUMENTS

EP  2196666 A1  6/2010
EP  2530303 A1  12/2010

(Continued)

*Primary Examiner* — Tulsidas C Patel
*Assistant Examiner* — S. Mikailoff
(74) *Attorney, Agent, or Firm* — Barclay Damon LLP (57) ABSTRACT

A method for operating a wind turbine comprises capturing an actual value of a fed-in power ($P_{act}$) and determining a power deviation based on the captured actual value of the fed-in power ($P_{act}$). A signal value is set for a correction of a setpoint value for the rotor blade pitch angle when one of the power deviation exceeds a predetermined maximum value and the power deviation exceeds a maximum gradient threshold value over a specified period of time. The signal value is cleared when one of the power deviation falls below a predetermined minimum value and a grid voltage value is located in a predetermined band around a specified target voltage value. A correction value ($d\beta/dt^*$) is determined for the setpoint value of the rotor blade pitch angle depending on the power deviation and applied to a rotor blade pitch control when the signal value is set.

3 Claims, 4 Drawing Sheets

(52) U.S. Cl.
CPC ............ *F03D 7/043* (2013.01); *F03D 9/255* (2017.02); *F05B 2270/101* (2013.01); *F05B 2270/327* (2013.01); *F05B 2270/337* (2013.01)

(56) References Cited

U.S. PATENT DOCUMENTS

| | | | | |
|---|---|---|---|---|
| 9,309,866 | B2* | 4/2016 | Warfen | F03D 7/0224 |
| 10,480,488 | B2* | 11/2019 | Drossel | F03D 7/042 |
| 2003/0151259 | A1* | 8/2003 | Feddersen | F03D 7/0224 |
| | | | | 290/44 |
| 2004/0145188 | A1 | 7/2004 | Janssen et al. | |
| 2008/0277938 | A1 | 11/2008 | Oohara et al. | |
| 2011/0037263 | A1* | 2/2011 | Warfen | F03D 7/0224 |
| | | | | 290/44 |
| 2011/0156389 | A1* | 6/2011 | Arlaban Gabeiras | H02J 3/386 |
| | | | | 290/44 |
| 2012/0306203 | A1* | 12/2012 | Drossel | F03D 7/0224 |
| | | | | 290/44 |
| 2016/0305403 | A1* | 10/2016 | Zheng | F03D 7/0244 |
| 2017/0107973 | A1* | 4/2017 | Drossel | F03D 1/06 |
| 2017/0152836 | A1* | 6/2017 | Kjaer | G05B 19/402 |

FOREIGN PATENT DOCUMENTS

| | | | |
|---|---|---|---|
| EP | 2327878 | A1 | 6/2011 |
| EP | 2767711 | A1 | 8/2014 |
| WO | 2008/031433 | A1 | 3/2008 |
| WO | 2008/031434 | A2 | 3/2008 |
| WO | 2009/083447 | A2 | 7/2009 |
| WO | 2011/009958 | A2 | 1/2011 |

* cited by examiner

METHOD FOR OPERATING A WIND TURBINE TO CONTROL ROTATIONAL SPEED OF A WIND TURBINE IN THE EVENT OF A GRID ERROR

CROSS REFERENCE TO RELATED INVENTION

This application is based upon and claims priority to, under relevant sections of 35 U.S.C. § 119, European Patent Application No. 19 167 076.9, filed Apr. 3, 2019, the entire contents of which are hereby incorporated by reference.

BACKGROUND

The present invention relates to a method for operating a wind turbine with at least one rotor blade with an adjustable rotor blade pitch angle and a generator feeding electrical power to an electrical supply grid.

It is generally known that wind turbines must reduce their power extraction from the wind in the event of a voltage error. For this, the prior art provides that voltage drops are reacted to with a change in the rotor blade pitch angle.

US 2004/0145188 A1 discloses a wind turbine as well as a method for operating such a wind turbine, wherein a rotor blade pitch angle is changed in response to a detected voltage error in order to reduce the power extraction of the rotor. A change in the rotor blade pitch angle takes place when a voltage measured on the low voltage side, which is assumed to be representative of the grid voltage, falls below a predetermined value with respect to the rated voltage for a specified period of time.

WO 2008/031434 A2 discloses a wind turbine as well as a method for operating such a wind turbine, wherein a rotor blade pitch angle is changed in a delayed manner after the occurrence of an overspeed as the result of a grid error.

WO 2008/031433 A1 discloses a wind turbine as well as a method for operating a wind turbine, wherein a rotor blade pitch angle is changed in response to a detected grid error and mechanical oscillations or operating loads. The occurrence of increased rotational speeds is permitted in the case of the method.

US 2008/0277938 A1 discloses a wind turbine, which feeds to an electrical grid, as well as a method for operating such a wind turbine, wherein a rotor blade pitch angle is changed in response to an abnormal state of the wind turbine or in the electrical grid. A state-dependent selector is used to select from a plurality of identified control signals for the rotor blade pitch angle. The occurrence of increased rotational speeds is permitted in the case of the method.

WO 2009/083447 A2 discloses a wind turbine as well as a method for operating such a wind turbine, wherein a rotor blade pitch angle is changed in response to a detected grid error. A state-dependent selector is used to select from a plurality of identified control signals for the rotor blade pitch angle.

EP 2 327 878 A1 discloses a rotor blade pitch controller for a wind turbine, which is set up to change a rotor blade pitch angle in response to a detected voltage deviation in the DC link of a converter, the voltage at the grid link point, the rotor rotational speed or the grid frequency.

EP 2 196 666 A1 discloses a wind turbine, a rotor blade pitch controller for a wind turbine as well as a method for operating such a wind turbine, wherein a rotor blade pitch angle is changed in response to a detected voltage error. The value of an I member of the rotor blade pitch controller is changed in response to the detection of a grid error via a signal pulse. The value of the I member is also retained after the error elimination so that a re-acceleration of the rotor after error elimination is delayed or further steps are required for it.

WO 2011/009958 A2 discloses a wind turbine as well as a method for operating such a wind turbine, wherein a rotor blade pitch angle is changed in response to a detected grid error depending on the wind speed. The occurrence of increased rotational speeds is permitted in the case of the method.

EP 2 530 303 A2 discloses a wind turbine as well as a method for operating such a wind turbine, wherein a rotor blade pitch angle is changed in response to a detected grid error depending on a change in the generator torque. The occurrence of increased rotational speeds is also permitted by the method.

EP 2 767 711 A1 discloses a wind turbine as well as a method for operating such a wind turbine, wherein a minimum rotor blade pitch angle is changed in response to a detected grid error depending on the grid voltage. The occurrence of increased rotational speeds can also hereby occur.

BRIEF SUMMARY OF THE INVENTION

The object of the invention is to provide a method for operating a wind turbine, which mainly prevents or at least considerably reduces in an effective manner an increase in the rotational speed on the wind turbine in the event of a grid error.

An embodiment of a method is provided and determined for operating a wind turbine. The wind turbine thereby has at least one rotor blade with an adjustable rotor blade pitch angle as well as a generator via which an electrical power can be fed to an electrical supply grid. The method according to the invention captures an actual value of the fed-in electrical power. A power deviation with respect to a target power value is determined from the captured actual value of the fed-in electrical power. Differently from the prior art, the method according to the invention is geared towards the consideration of the fed-in electrical power for the correction of the rotor blade pitch angle. For this, as per the method according to the invention, a power deviation is determined depending on a captured actual value. In a subsequent step, a signal value is set for a correction of the rotor blade pitch angle. The signal value is set when the power deviation exceeds a predetermined maximum value. Alternatively or additionally, the signal value is set when the power deviation exceeds a specified maximum gradient over a specified period of time. It is also provided according to the invention to clear the set signal value if the power deviation falls below a predetermined minimum value.

Alternatively or additionally, the signal value can also be cleared based on a comparison of the grid voltage with the specified target voltage value. The comparison preferably determines whether the grid voltage value is located in a predetermined band around the specified target voltage value. By setting and clearing the signal value, a defined state is always provided for the signal value for the method according to the invention for operating the wind turbine: it is either set or the set signal value is cleared. In an embodiment, the signal value is only cleared when a condition for clearing the signal value is met. If the signal value is set, it also remains if the condition originally underlying the setting becomes inapplicable.

In a further step, a correction value for the rotor blade pitch angle is determined based on the temporal change of the fed-in power. In an embodiment, the method comprises switching on, or applying of the correction value for a rotor blade pitch control as long as the signal value is set. This switching on has a series of feedback control advantages. On one hand, the rotor blade pitch control can continue to be used without a major change in the program code of the control software. Through the use of the signal value, there is no interference with the functionality of the rotor blade pitch control; rather only an additional correction value is input. On the other hand, it has proven to be advantageous in particular for a quick change in the rotor blade pitch angle and thus for a restriction of the rotational speed increase to not focus on the voltage in the electrical supply grid but rather here to focus on the power deviation since it is linked more closely with the rotor rotational speed via the balance from the power extracted from the wind and the power fed to the grid. In the event of a voltage error in the electrical supply grid, only limited power can be fed to the grid based on the restriction of the ampacity of the involved components in particular in the case of deep voltage errors. If the wind turbine feeds less power to the grid than its rotor extracts from the wind, this results in a rotational speed increase. Overspeeds can lead to damage to the wind turbine. Since different grid connection guidelines (grid codes) also have demands with respect to the power supply after the elimination of transient voltage errors, a power-based control is advantageous. With the help of the power change, a correction of the rotor blade pitch angle that is fast and improved with respect to the power infeed can be performed and the rotational speed increase can thus be restricted early on.

In a preferred embodiment of the method, a difference between the actual value of the fed-in electrical power and a setpoint value for the power is accessed for the power deviation. The special advantage in the case of this method is that error incidents not present in the supply grid can also be reacted to. Other error causes are for example a defect in the main converter, which can also lead to a rotational speed increase for example in the case of the outage of a power-converting subassembly (power stack). In that it can be determined with the power deviation that the deviation of the fed-in power from the setpoint value of the power to be fed in is too large, an error can be reacted to early on.

In a preferred embodiment of the method, the correction value for the rotor blade pitch angle depends on the temporal change of the fed-in power, i.e. the actual value of the fed-in power. The actual value of the fed-in power is input for example to a determination block for the correction value. The pilot block is set up to save cyclically input actual values and to determine the temporal change of the actual power over at least one time period from a current and at least one previous actual value. The pilot block can be set up to determine power changes $\Delta P$ over short periods of time $\Delta t$ of 1 ms or $\Delta P/\Delta t$ over larger periods of time $\Delta t$, e.g. a quarter or half of a grid period (5 or respectively 10 ms in 50 Hz grids). The pilot block can also be set up to perform a smoothing via several measurement values. The smoothing can take place for example depending on the temporal change of the actual value of the fed-in electrical power.

In a preferred embodiment of the method according to the invention, a rotational speed controller is designed to determine the change speed for the rotor blade pitch angle depending on an actual value of a rotational speed. In this embodiment, the rotational speed of the rotor is determined for example; a fast speed shaft or a slow speed shaft and its rotational speed can hereby be accessed for example at the drive train. A change speed for the rotor blade pitch angle is specified depending on the actual value of the rotational speed. The change speed for the rotor blade pitch angle is preferably input to a rotor blade pitch control, which preferably has an integrator, which integrates the change speed for the rotor blade pitch angle into a setpoint value for the rotor blade pitch angle.

In a preferred embodiment of the method, the correction value for the rotor blade pitch angle is determined as a change speed for the rotor blade pitch angle. This means that the power-dependent correction value for the rotor blade pitch angle can be added to the rotational-speed-dependent change speed for the rotor blade pitch angle input to the rotor blade pitch control when the signal value is set.

In a further embodiment of the method, the larger the correction value for the rotor blade pitch angle, the larger the power deviation at least in one interval of the power deviations. This means that as the power deviation increases so does the correction value used in this area. Thus, in this area there is a strictly monotonic dependency, in particular a monotonic increasing or a strictly monotonic increasing dependency.

The captured actual value of the fed-in power is preferably an actual value of the fed-in active power. In the case of a prioritization of the reactive power, it is also possible to switch to an actual value of the fed-in reactive power.

BRIEF DESCRIPTION OF THE DRAWINGS

The method according to the invention for operating a wind turbine will be further explained below with reference to an exemplary embodiment. In the figures.

DETAILED DESCRIPTION OF THE INVENTION

Figure 1A:
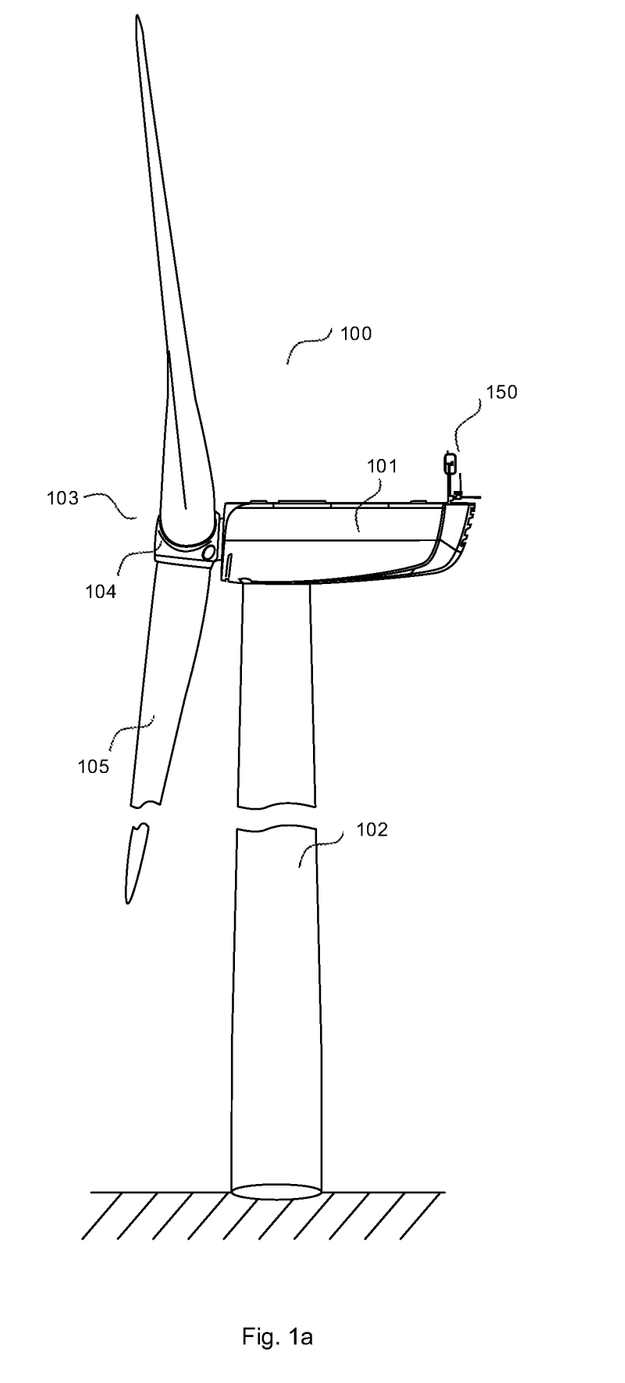
FIG. 1a illustrates an elevational schematic view of an embodiment of a wind turbine.

FIG. 1a shows a wind turbine 100 with a nacelle 101 and a stand device 102. The stand device is designed as a tower in the example shown. The wind turbine 100 has a rotor 103 with a rotor hub 104, on which three rotor blades 105 are arranged, for a rotation about a mainly horizontal axis. A sensor array 150 for capturing environmental parameters of the wind turbine 100 is provided on the nacelle 101. For example, an anemometer 151 (see FIG. 1b) can be provided for capturing the wind speed at the sensor array 150. The three rotor blades 105 are respectively connected with a rotor blade pitch controller 106 (see FIG. 1b), which permits a rotation of the rotor blades about their longitudinal axis. The rotor blades have a circular blade connection area and are rotatably mounted in the rotor hub for the rotation about their longitudinal axis that is perpendicular to the pitch bearing. The rotational movement can be executed e.g. via an electrical or a hydraulic drive. Alternatively or additionally, an activation of actuators integrated into the rotor blades can also take place, which change the aerodynamic properties of the rotor blades (active flow control). An alternative flow control can support the rotor blade pitch control used according to the invention in a particularly advantageous manner.

Figure 1B:
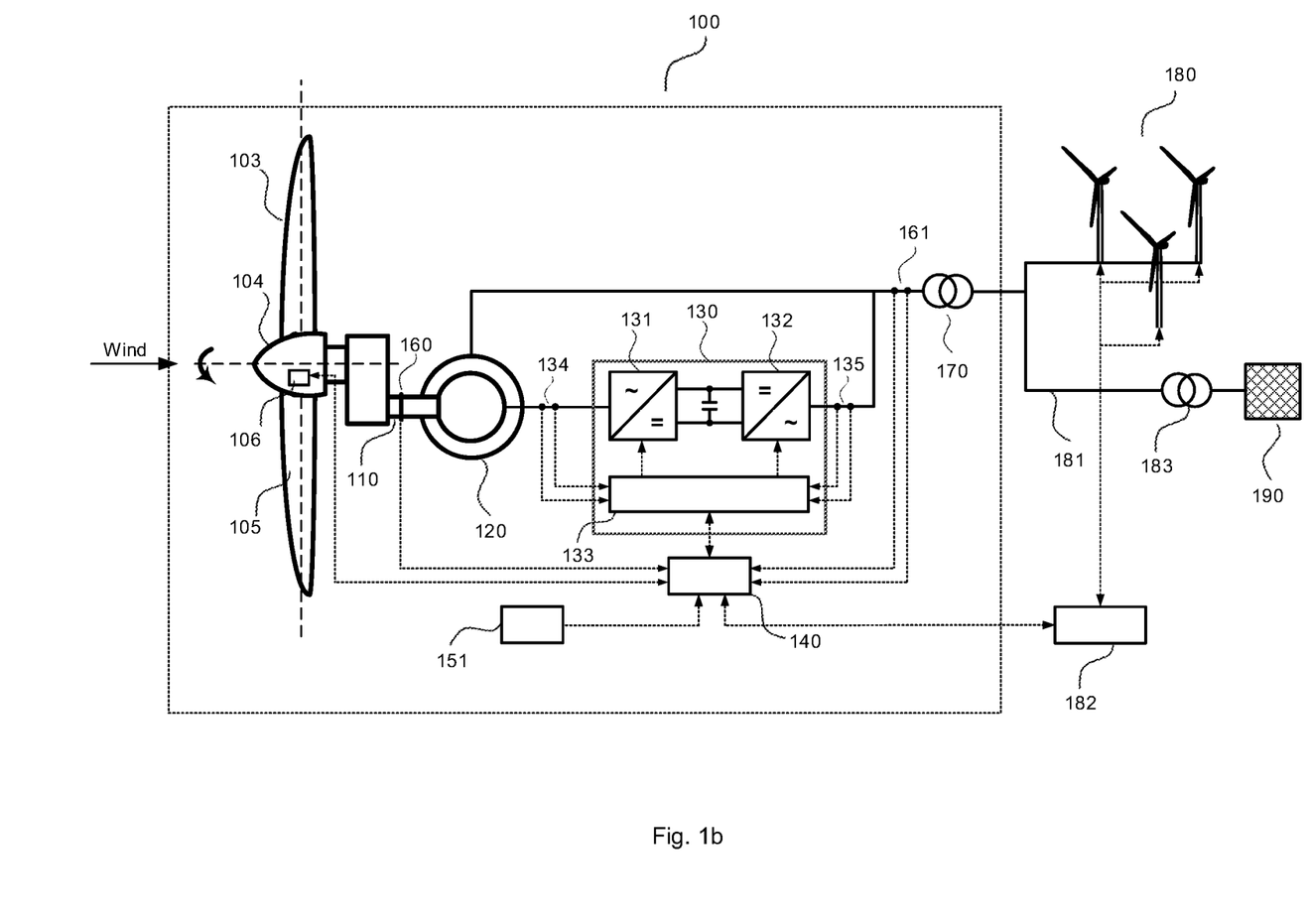
FIG. 1b illustrates a schematic view of an embodiment of an electrical system of the wind turbine in a wind farm.

FIG. 1b shows in a schematic view mainly the electrical structure of a wind turbine 100 in a wind farm 180, which is connected to an electrical supply grid 190 and feeds an electrical power to it. The wind flowing against the rotor 103 (left edge) causes the rotor 103 with the rotor hub 104 and the rotor blades 105 to turn. The rotational movement drives a generator 120 via a drive train 110. In the exemplary embodiment shown, the drive train 110 drives the rotor of the generator 120. The electrical configuration of the generator 120 corresponds with that of a double-fed asynchronous machine, its stator winding directly and its rotor winding indirectly, via a main converter 130 with the electrical supply grid 190. The infeed of electrical power to the supply grid 190 takes place via the stator of the generator as well as via the main converter 130. The main converter 130 has a generator-side converter 131 and a grid-side converter 132. Via the generator-side converter 131, a control of the rotor field of the generator 120 and thus of the stator field and of the electrical power fed directly to the supply grid 190 by the stator takes place so that the infeed takes place grid-synchronously. The grid-side converter 132 is set up to feed electrical power from the rotor winding grid-synchronously to the electrical supply grid 190. Both converters 131, 132 are interconnected via a direct current link. For the control, a converter controller 133 is provided, which is connected to a wind turbine controller 140. The wind turbine controller 140 is in turn connected to a wind farm controller 182, which is linked with the other wind turbines in the wind farm 180 for a bidirectional exchange of data. The wind turbine 100 is connected electrically to a medium-voltage power grid 181 covering the area of the wind farm via a transformer 170. The medium-voltage power grid 181 is connected electrically to the electrical supply grid 190 via another transformer 183. The power fed in from the wind turbine is fed in to the electrical supply grid via the medium-voltage power grid 181.

The wind turbine controller 140 is connected to and communicates with the rotor blade pitch controller 106 and is among other things set up to communicate setpoint values for the rotor blade pitch angle and/or its temporal change to the rotor blade pitch controller 106. The wind turbine controller 140 is connected to different sensors of the wind turbine. The drive train 110 of the wind turbine has a rotational speed sensor 160, which is set up to communicate rotational speed measurement values to the wind turbine controller 140. Thus, the actual value of the rotational speed $n_r$ is input to the wind turbine controller 140. Sensors of the sensor array 150, such as e.g. the anemometer 151, are also connected to the wind turbine controller 140. Current and/or voltage values and/or variables calculated from these values, for example the grid frequency, the phase angle and/or the fed-in active power and/or the fed-in reactive power, which are captured via a sensor 161 on the side of the wind turbine 100 in front of the transformer 170 or respectively determined from the measurement variables, are also input to the wind turbine controller 140. The converter controller 133 receives its signals from the wind turbine controller 140 and obtains current and/or voltage measurement values and/or variables calculated from them, which are captured on the rotor or respectively grid side by the main converter 130 via corresponding measurement sensors 134, 135. The wind turbine controller 140 gives the converter controller 133 for example setpoint values for the power, such as for example setpoint values for an active power or setpoint values for a reactive power. The wind turbine controller 140 can also give the main converter controller 130 a priority for reactive and/or effective power. The wind turbine controller 140 is set up in particular to execute the method according to the invention based on FIG. 2 described below or respectively to enable its execution.

Figure 2:
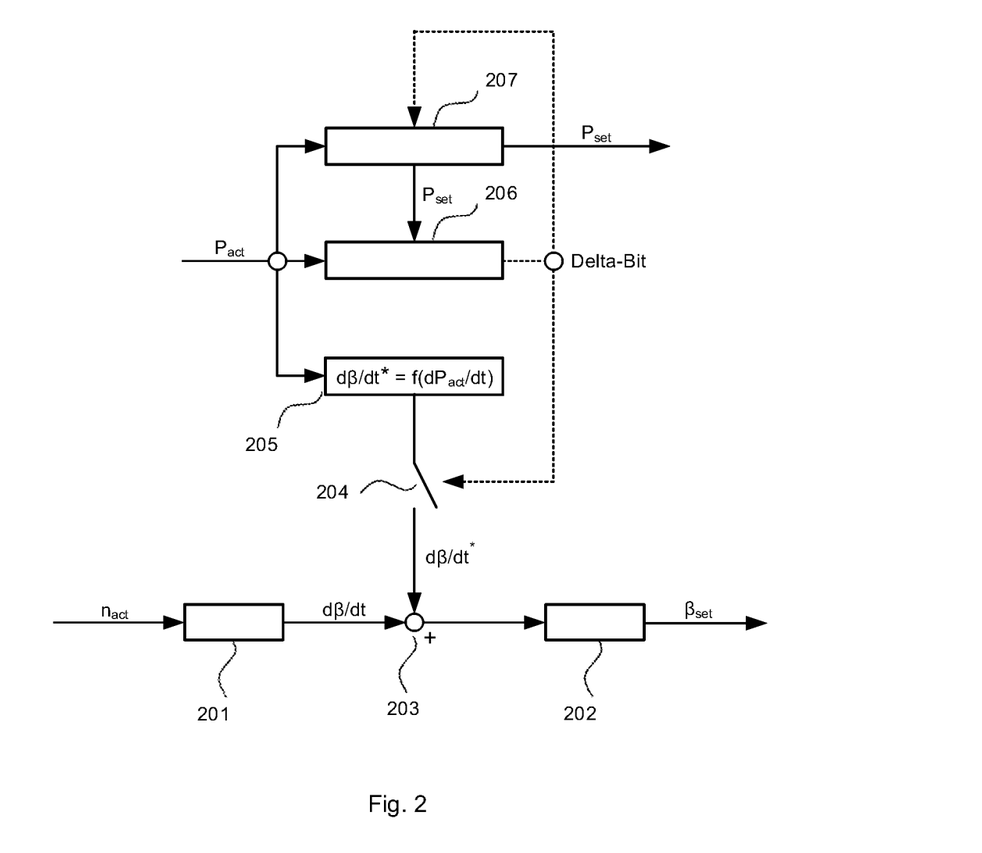
FIG. 2 illustrates a partial schematic view of a control of the rotor blade pitch angle.
Figure 3:
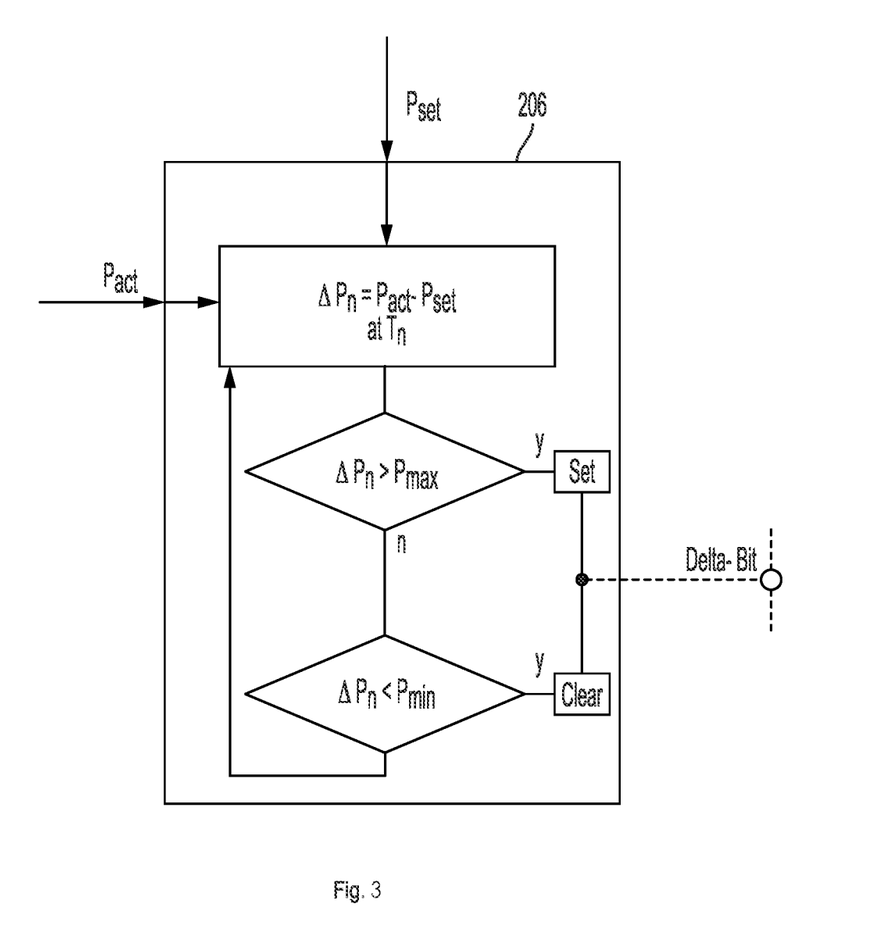
FIG. 3 illustrates a partial schematic view of a control of the rotor blade pitch angle of FIG. 2.

FIG. 2 shows the important aspects of the control method for the blade pitch angle, which takes place continuously during the operation of the wind turbine. The control elements described below can be included both in software as well as in hardware and can be part of the wind turbine controller 140, for example. The control has a rotational speed controller 201 as well as a rotor blade pitch controller 202. An actual value for a rotational speed $n_{act}$ is input to the rotational speed controller 201, from which a change speed is determined for the rotor blade pitch angle dβ/dt. Such a rotational speed controller 201 is known from the prior art and a person skilled in the art is familiar with how the actual value needs to be converted into a change in the rotor blade pitch angle.

The change speed for the rotor blade pitch angle is input to the controller is integrated via the rotor blade pitch controller 202 and a rotor blade angle βset is specified as the setpoint value. The setpoint value for the rotor blade angle βset can then be set for one or several rotor blades. However, the method suggested here can generally also be combined with methods in which an individual pitch control of the individual rotor blades of the rotor takes place.

A captured actual value for the fed-in power Pact is analyzed for a correction value of the rotor blade pitch angle in a different manner. In a difference block 206, a difference value ΔPn between the actual value for the fed-in power Pact is input to the difference block 206 and the power setpoint value Pset input to the difference block 206 is formed in the exemplary embodiment shown. Furthermore, the resulting difference ΔPn is compared with a specified maximum value ΔPmax and a minimum value ΔPmin in the difference block 206. It is hereby such that, when ΔPn exceeds the maximum value ΔPmax, the signal value (delta bit) is set. If the resulting difference value ΔPn is below the minimum value ΔPmin, the signal value is cleared. It can hereby be provided that the maximum value ΔPmax for the setting of the signal value is greater than the minimum value ΔPmin for the clearing of the signal value. An unstable switching back and forth between a switched-on and switched-off signal value can be avoided through the use of such a hysteresis method. The signal value is technically a flag, which, when set or not set, is analyzed by the control. The maximum value ΔPmax and the minimum value ΔPmin can be specified for example as a fraction of the nominal power Pnom of the wind turbine. For example, the maximum value ΔPmax can be specified in the range of approximately 10% to 20% of the nominal power Pnom and the minimum value ΔPmin in the range of approximately 5% to 10% of the nominal power Pnom. Once the signal value is set, it remains set until a condition for clearing the signal value is present. The signal value also remains set when the condition that caused the signal value to be set is no longer applicable.

More complex conditions can also be checked for the setting of the signal value. For example, the comparison of the power difference ΔPn with the maximum value ΔPmax at point in time Tn is linked with another AND condition. As another condition, it can be checked for example whether or not the power difference ΔPn−1 at a previous point in time Tn−1 was greater than that of the maximum value ΔPmax. The setting of the signal value then only takes place if both conditions are met, i.e. if the current power difference ΔPn exceeds the maximum value ΔPmax and the previous power difference ΔPn−1 does not exceed the maximum value ΔPmax. If points in time Tn−1 and Tn are for example only a few milliseconds up to approximately 10 milliseconds apart, a rapid change in the fed-in power can be determined and used as the trigger criterion for the adjustment of the rotor blades. In order to be able to check such an additional condition, the difference block 206 can have a memory in which the input actual values and/or difference values determined from them are saved cyclically. For this, a digital ring buffer can be provided, which continuously saves input values over a certain period of time at a specified cadence and overwrites it again after a specified period of time passes in order to release the storage space for new data again. For example, i determined power differences ($\Delta Pn$, $\Delta Pn-1$, ..., $\Delta Pn-1$) are saved every 10 milliseconds and cyclically over a period of 50 ms. However, the cadence and the period of time can be reduced or increased as needed. The values $\Delta Pn$ and $\Delta Pn-1$ for the checking of the previously named condition are thus present in the difference block 206.

To set the signal value, in addition to the two previous examples, another condition can be checked, which, as an OR condition, is alone sufficient for the setting of the signal value. For example, the comparison of the power deference $\Delta Pn$ with the maximum value $\Delta Pmax$ at a point in time Tn is linked with another AND condition. As another condition, it can be checked for example whether or not the temporal change in the power difference is smaller than a maximum gradient threshold value $(\Delta P/\Delta T)max$ over a specified period of time. The difference block 206 can be set up for example to determine the difference $\Delta P$ between the current power difference $\Delta P_n$ at a point in time $T_n$ and the power difference $\Delta P$ at an even earlier previous (compared to previous point in time $T_{n-1}$) point in time $T_{n-4}$. The gradient $\Delta P/\Delta T$ results from the division of the difference $\Delta P$ of the two power differences through the temporal difference $\Delta T$ of the difference in two points in time Tn and $\Delta P_{n-4}$. The signal value is only set when both conditions are met, i.e. when the current power difference $\Delta P_n$ exceeds the maximum value $\Delta P_{max}$ and the power gradient $(\Delta P/\Delta T)$ does not exceed the gradient threshold value $(\Delta P/\Delta T)_{max}$. If points in time $T_{n-4}$ and $T_n$ are for example 30-50 milliseconds apart, multiple errors can thus be reacted to by overriding the correction variable, even if the error that led to the original triggering of the signal value was already cleared in the meantime by the presence of a condition sufficient for the clearing. The previously described ring buffer should be designed such that the values necessary to check the condition can be read from the memory.

Additionally or alternatively, other conditions can also be checked to clear the signal value. For example, the difference block can be set up to compare further measurement variables with specified threshold values or to analyze error states or error messages present in the control of the wind turbine. For this, measurement variables of the sensors (150, 151, 160, 161) can be accessed, for example. For example, the signal value can be cleared if the grid voltage value returns to a predetermined band around the specified setpoint voltage value.

The captured actual value for the fed-in power Pact is also input to a power controller 207. The power controller 207 is set up to control the power infeed of the wind turbine. For this, among other things, power setpoint values of the wind farm controller 182 and additional measurement variables are input to it. The power controller 207 determines the power setpoint value Pset, which is input to a converter or other electrical control for the generator (not shown here) in order to generate and feed in the corresponding power. Moreover, the power setpoint value Pset determined by the power controller 207 is input to the difference block 206, where the delta bit is determined as the signal value together with the actual value for the fed-in power Pact. The power controller 207 is set up to cyclically save certain power setpoint values identified to control the wind turbine. The memory is thereby configured such that temporally previous values remain saved at least for a specified short period of time. A digital ring buffer can be provided for this. The delta bit is input to the power controller 207 as a signal value that is output by the difference block 206. The power controller 207 is set up to cyclically check whether the signal value is set and, if it is set, to retrieve and save a temporally previous power setpoint value Pset,freeze from the memory until the signal value is cleared again. An additional memory can be provided for this. The power controller 207 is furthermore set up so that it, as long as the signal value is set, outputs to the difference block 206 the saved previous power setpoint value Pset,freeze instead of the current power setpoint value Pset. The determination of the power deviation can thereby take place in the difference block 206 depending on the power setpoint value set before the error occurred.

Additionally, the saved previous power setpoint value Pset,freeze can also be used to control the wind turbine and can be specified for example as the setpoint value for a transition period after the signal value has been cleared. The retrieval takes place such that a temporally previous power setpoint value is thereby selected, which was determined sufficiently prior to the occurrence of the error. Since the suggested method is suggested for errors, which necessitate quick intervention in the rotor blade control, the prior value can lie 1 to a few 10 milliseconds back with respect to the current value. The cadence can be selected to be the same for all method steps, e.g. 5 or 10 milliseconds. Otherwise, the power controller 207 can be set up to continue to determine and to save power setpoint values even if the signal value is set. After clearing the signal value or respectively after a transition period has passed, the power controller 207 can continue the power setpoint value specification for normal operation.

FIG. 2 also shows a rotor blade pitch angle pilot block 205, in which a correction value $d\beta/dt^*$ is determined depending on the captured actual value for the fed-in power Pact. The temporal change in the power actual value dPact/dt is accessed here. The functional correlation between the temporal change of the power actual value and the correction value is thereby such that at least in areas a strict monotony is present, i.e. an increasing change in the power deviation with dPact/dt leads to a larger correction value dp/dt*. The rotor blade pitch angle pilot block 205 is set up to cyclically save input actual values Pact and to determine the temporal change in the actual power dPact/dt over at least one period of time from the most current and at least one previous actual value. A digital ring buffer can also be provided for this. The rotor blade pitch angle pilot block 205 can be set up to determine power changes $\Delta P$ over infinitesimal periods of time $\Delta t$ of 1 ms or $\Delta P/\Delta t$ over larger periods of time $\Delta t$, e.g. a quarter or half of a grid period (5 or respectively 10 ms in 50 Hz grids). The pilot block can also be set up to perform a smoothing over several measurement values.

It is provided in the method according to the invention that a switch 204 is opened or closed depending on the signal value. In the case of a closed switch 204, the correction value $d\beta/dt^*$ is input to an addition member 203 and is added to the change speed for the rotor blade pitch angle dp/dt output by the rotational speed controller 201. The sum of the setpoint value $d\beta/dt$ determined by the rotational speed controller 201 and the correction value dβ/dt* determined by the rotor blade pitch angle pilot block 205 is then input to the rotor blade pitch controller 202. If the correction term is positive, then the setpoint value for the change speed for the rotor blade pitch angle is increased in the case of the addition. The value of the integral of the rotor blade pitch controller 202 is increased accordingly. It is thus pitched faster, i.e. the rotor blade pitch angle is changed with a higher speed.

LIST OF REFERENCE NUMBERS

100 Wind turbine
101 Nacelle
102 Stand device
103 Rotor
104 Rotor hub
105 Rotor blade
106 Blade angle pitch device
110 Drive train
120 Generator
130 Main converter
131 Generator-side converter
132 Grid-side converter
133 Converter controller
134 Current/voltage sensor
135 Current/voltage sensor
140 Wind turbine controller
150 Sensor array
151 Anemometer
160 Rotational speed sensor
161 Current/voltage sensor
170 Transformer
180 Wind farm
181 Medium-voltage grid
182 Wind farm controller
183 Transformer
190 Electrical transmission grid
201 Rotational speed controller
202 Rotor blade pitch controller
203 Addition member
204 Switch
205 Rotor blade pitch angle pilot block
206 Difference block
207 Power controller
208 Memory block

The invention claimed is:

1. A method for operating a wind turbine with at least one rotor blade having a rotor blade pitch angle that is adjustable and a generator configured to feed power to an electrical supply grid, the method comprising:
capturing an actual value of a fed-in power ($P_{act}$) fed by the generator to the electrical supply grid;
determining a power deviation (ΔP) as one of: (1) a difference between the captured actual value of the fed-in power ($P_{act}$) and a power setpoint value ($P_{set}$); and (2) a time rate of change ($dP_{act}/dt$) of the captured actual value of the fed-in power ($P_{act}$);
determining a correction value (dβ/dt*) for a setpoint value of the rotor blade pitch angle ($β_{set}$) depending on the power deviation (ΔP);
communicating the correction value (dβ/dt*) for a setpoint value of the rotor blade pitch angle (β) to a rotor blade pitch controller;
setting a signal value when one of: (1) the power deviation (ΔP) exceeds a predetermined maximum power deviation value ($ΔP_{max}$); and (2) a change of the power deviation over a specified period of time (ΔP/ΔT) exceeds a maximum gradient threshold value during over a specified period of time, $(ΔP/ΔT)_{max}$;
correcting the rotor blade pitch angle ($β_{set}$) of the at least one rotor blade when the signal value is set, wherein the rotor blade pitch angle ($β_{set}$) is corrected according to the correction value (dβ/dt*) for the setpoint value of the rotor blade pitch angle ($β_{set}$) provided by the rotor blade pitch controller; and
clearing the signal value when at least one of: (1) the power deviation (ΔP) falls below a predetermined minimum power deviation value ($ΔP_{min}$); and (2) a grid voltage value of the electrical supply grid is located in a predetermined voltage band around a predetermined target voltage value for the grid voltage, and
wherein the predetermined maximum power deviation value ($ΔP_{max}$) is approximately 10%-20% of a nominal power of the wind turbine, and wherein the predetermined minimum power deviation value ($ΔP_{min}$) is approximately 5%-10% of the nominal power of the wind turbine.

2. The method according to claim 1, wherein an actual value for a rotational speed of the wind turbine ($n_{act}$) is input into the rotor blade pitch controller, and wherein a change speed for the rotor blade pitch angle (dβ/dt) is determined by the rotor blade pitch controller depending on the actual value for the rotational speed of the wind turbine ($n_{act}$) and wherein correcting the at least one rotor blade pitch angle is performed at the determined change speed for the rotor blade pitch angle (dβ/dt).

3. The method according to claim 2, wherein the rotor blade pitch controller comprises an integrator configured to integrate the change speed for the rotor blade pitch angle (dβ/dt) to determine the setpoint value of the rotor blade pitch angle ($β_{set}$), and wherein the setpoint value of the rotor blade pitch angle ($β_{set}$) is communicated to the rotor blade pitch controller.

* * * * *